United States Patent
Haughn et al.

(10) Patent No.: US 9,060,278 B2
(45) Date of Patent: Jun. 16, 2015

(54) MOBILE SUBSCRIBER DEVICE NETWORK ACCESS

(75) Inventors: Erick Haughn, Norcross, GA (US);
Judson John Flynn, Decatur, GA (US);
John Lewis, Lawrenceville, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 482 days.

(21) Appl. No.: 12/613,104

(22) Filed: Nov. 5, 2009

(65) Prior Publication Data
US 2011/0105080 A1   May 5, 2011

(51) Int. Cl.
| H04W 4/00 | (2009.01) |
| H04W 12/08 | (2009.01) |
| G06F 21/33 | (2013.01) |
| H04L 29/06 | (2006.01) |
| H04M 1/66 | (2006.01) |
| H04W 4/20 | (2009.01) |
| H04L 29/08 | (2006.01) |

(52) U.S. Cl.
CPC ............. *H04W 12/08* (2013.01); *G06F 21/335* (2013.01); *G06F 2221/2119* (2013.01); *H04L 63/18* (2013.01); *H04W 4/20* (2013.01); *H04L 67/02* (2013.01)

(58) Field of Classification Search
CPC ...... H04W 36/30; H04W 12/06; H04W 48/18
USPC ................................ 370/332; 455/411, 435.2
See application file for complete search history.

(56) References Cited

U.S. PATENT DOCUMENTS

| 5,889,958 | A | 3/1999 | Willens |
| 6,389,284 | B1 | 5/2002 | Cook et al. |
| 6,587,684 | B1 | 7/2003 | Hsu et al. |
| 6,738,382 | B1 | 5/2004 | West et al. |
| 6,850,285 | B2 * | 2/2005 | Eaton et al. ................... 348/563 |
| 7,428,413 | B2 | 9/2008 | Fink |
| 2004/0125781 | A1 | 7/2004 | Walter et al. |
| 2004/0181602 | A1 | 9/2004 | Fink |
| 2004/0233893 | A1 | 11/2004 | Zhou et al. |
| 2004/0236702 | A1 * | 11/2004 | Fink et al. ....................... 705/73 |
| 2005/0026593 | A1 | 2/2005 | Anderson et al. |
| 2005/0064845 | A1 | 3/2005 | Clingerman et al. |

(Continued)

OTHER PUBLICATIONS

Wireless LAN Roaming Solutions Built Upon HP OpenCall SS7, Solution Brief, www.hp.com/communication/opencall, Sep. 2009.

(Continued)

*Primary Examiner* — George Eng
*Assistant Examiner* — Muthuswamy Manoharan
(74) *Attorney, Agent, or Firm* — Toler Law Group, PC

(57) ABSTRACT

In one or more embodiments, one or more methods and/or systems described can perform receiving, from a first access point coupled to a first network and operated by a first network provider, an access code from a subscriber mobile device (MSD), associated with a second network provider, that accesses a uniform resource locator (URL) that includes the access code. The access code can be usable by the first network provider to determine whether or not to permit the MSD access of a second network coupled to the first network. In one or more embodiments, the URL is received by the MSD in a text message and/or from a short message service (SMS). In one or more embodiments, the MSD is operable to use telecommunications services of and provided by the second network provider. In one or more embodiments, the first network provider is the second network provider.

20 Claims, 10 Drawing Sheets

(56) References Cited

U.S. PATENT DOCUMENTS

| | | |
|---|---|---|
| 2005/0159135 A1* | 7/2005 | Kim ................ 455/410 |
| 2006/0033724 A1 | 2/2006 | Chaudhri et al. |
| 2006/0173810 A1 | 8/2006 | Hom et al. |
| 2006/0194569 A1 | 8/2006 | Hseuh |
| 2006/0294387 A1 | 12/2006 | McCracken et al. |
| 2007/0050083 A1 | 3/2007 | Signorelli et al. |
| 2007/0100649 A1 | 5/2007 | Walker et al. |
| 2007/0198443 A1* | 8/2007 | Chernev et al. ........... 705/500 |
| 2007/0291710 A1 | 12/2007 | Fadell |
| 2008/0089295 A1* | 4/2008 | Keeler et al. .............. 370/332 |
| 2008/0125106 A1 | 5/2008 | Lee et al. |
| 2008/0200148 A1* | 8/2008 | Fink .......................... 455/411 |
| 2008/0288423 A1 | 11/2008 | Eastman |
| 2009/0005080 A1 | 1/2009 | Forstall et al. |
| 2009/0006600 A1 | 1/2009 | Siegmund |
| 2009/0061840 A1 | 3/2009 | Fleischman et al. |
| 2009/0177385 A1 | 7/2009 | Matas et al. |
| 2009/0209240 A1 | 8/2009 | Mahowald |

OTHER PUBLICATIONS

Netopia Introduces Hot Spot Solution for Small Business Owners; All-in-One Wi-Fi Service With a Small Monthly Fee, Maximizes Profits for Individual Retailers, http://findarticles.com/p/articles/mi_m0EIN/is_2004_June_28/ai_n6088152, Jun. 28, 2004, pp. 5-8.

* cited by examiner

| Configuration 5030 | | | | |
|---|---|---|---|---|
| Source address information 6010 | Destination address information 6020 | Service information 6030 | Direction information 6040 | Permission information 6050 |
| Source address information 6011 | Destination address information 6021 | Service information 6031 | Direction information 6041 | Permission information 6051 |
| Source address information 6012 | Destination address information 6022 | Service information 6032 | Direction information 6042 | Permission information 6052 |
| Source address information 6013 | Destination address information 6023 | Service information 6033 | Direction information 6043 | Permission information 6053 |
| Source address information 6014 | Destination address information 6024 | Service information 6034 | Direction information 6044 | Permission information 6054 |
| Source address information 6015 | Destination address information 6025 | Service information 6035 | Direction information 6045 | Permission information 6055 |

FIG. 6

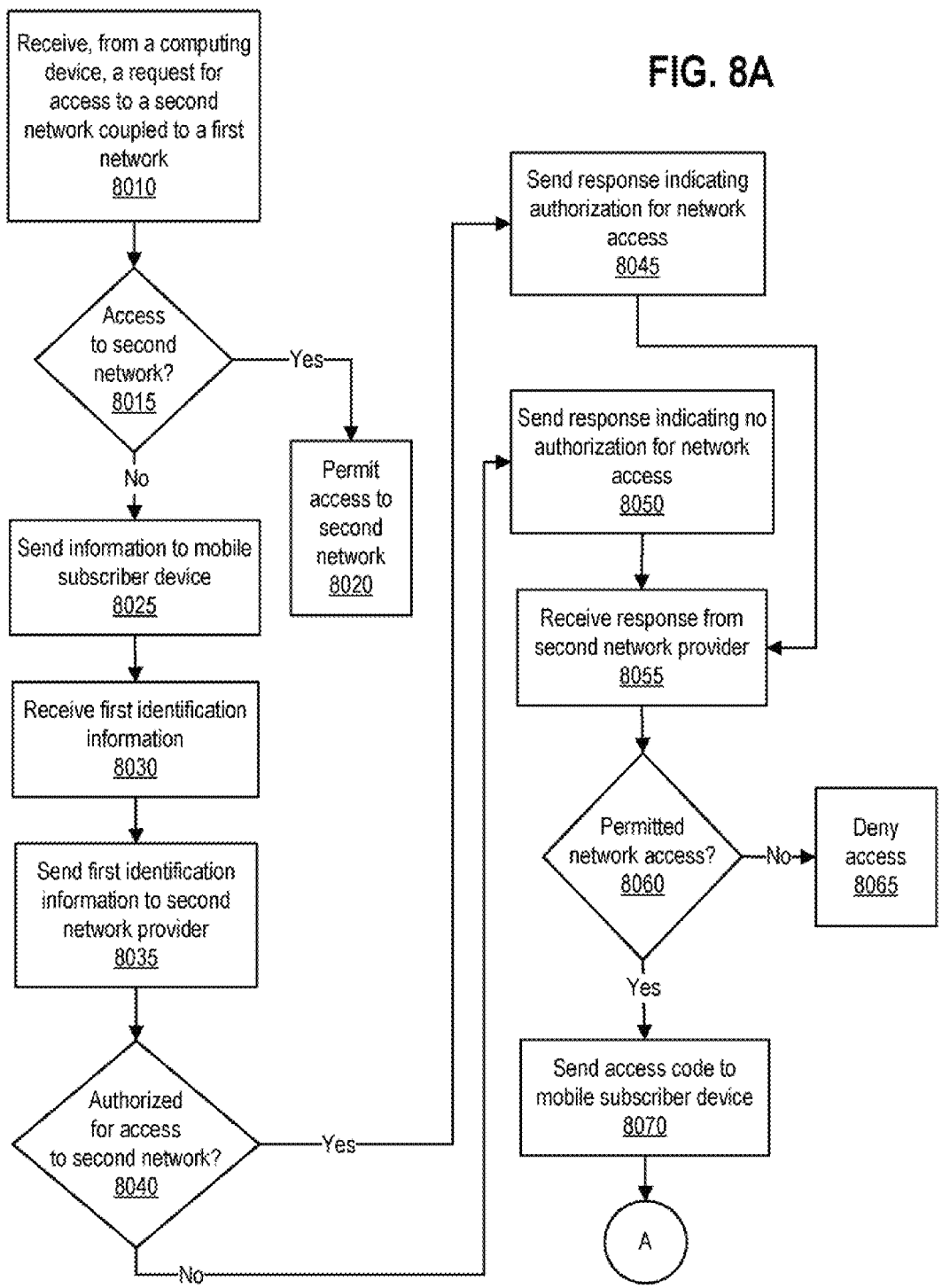

MOBILE SUBSCRIBER DEVICE NETWORK ACCESS

BACKGROUND

1. Technical Field

This disclosure relates generally to the field of Internet access and, more specifically, this disclosure pertains to the field of Internet access where network access to mobile subscriber devices is controlled.

2. Description of the Related Art

Several Internet service providers (ISPs) provide services at public locations such as hotels, airports, restaurants, coffee shops, etc. (so-called "hot-spots"). Many of these locations provide service for a fee. The fee may be provided via a web-browser interface using credit card, debit card, prepaid card, etc., or the user may be part of a subscriber group where access may be granted for the subscriber via submission of subscription credentials (e.g., a username and password) inputted by a user. However, direct fee collection from users can pose some complexity, can take up additional personnel resources, and may not allow a network provider to direct subscribers to hot-spots.

BRIEF DESCRIPTION OF THE DRAWINGS

The preferred embodiments will become apparent upon reading the following detailed description and upon reference to the accompanying drawings in which:

FIG. 6 provides a block diagram of an access control list configuration, according to one or more embodiments;

FIGS. 8A and 8B illustrate a method for accessing a network, according to one or more embodiments;

Figure 1:
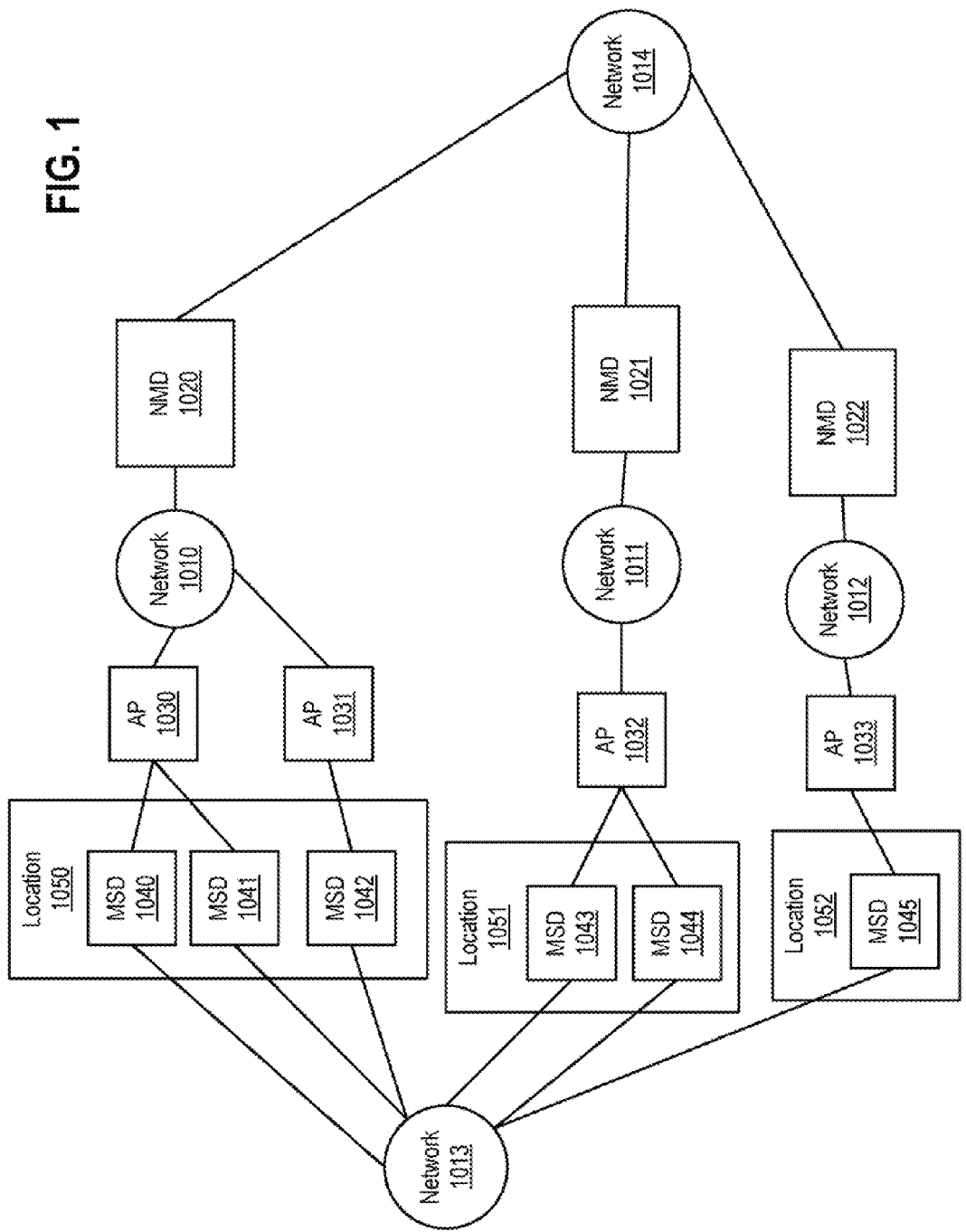
FIG. 1 provides a block diagram of a network communication system, according to one or more embodiments.

While the invention is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims.

DETAILED DESCRIPTION

FIG. 1 illustrates a block diagram of one or more network communications systems, according to one or more embodiments. In one or more embodiments, mobile subscriber devices (MSDs) 1040-1045 can be coupled to and communicate with network 1013. For example, network 1013 can be and/or implement a telecommunications network. For instance, network 1013 can be and/or implement a wireless telecommunications network that can support one or more wireless telecommunications network protocols such as one or more of General Packet Radio Service (GPRS), enhanced data rates for GSM evolution (EDGE), long term evolution, (LTE), CDMA (code division multiple access), TDMA (time division multiple access), and/or FDMA (frequency division multiple access), among others. In one or more embodiments, network 1013 can be coupled to and/or include a telephony network that can include a wireless cellular telecommunications network and/or a wireless satellite telecommunications network. In one or more embodiments, the telephony network can communicate information such as voice and/or data.

In one or more embodiments, network 1013 can implement and/or provide access and/or services of one or more other networks. For example, network 1013 can provide access and/or services of a public network (e.g., the Internet) to one or more of MSDs 1040-1045. In one or more embodiments, network 1013 provides access and/or services of one or more other networks at a lower data rate than network 1014 can provide to one or more of MSDs 1040-1045. For example, network 1013 can include less bandwidth than network 1014. In one or more embodiments, network 1014 can provide access and/or services of one or more other networks to MSDs 1040-1045 through one or more access points (APs) and/or one or more network management devices (NMDs).

In one or more embodiments, access to these networks can include one or more "services" these networks may provide. For example, these one or more services can include one or more of: email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, the one or more service can be associated with and/or correspond to one or more protocols of one or more computer and/or software applications.

As shown, MSDs 1040-1042 can be at a location 1050, and MSDs 1040 and 1041 can be coupled to an access point (AP) 1030. Mobile subscriber device (MSD) 1042 can be coupled to an AP 1031. As illustrated, APs 1030 and 1031 can be coupled to a network 1010 that can be coupled to a network management device (NMD) 1020. In one or more embodiments, MSDs 1040 and 1041 can be coupled to network 1010 via AP 1030, and MSD 1041 can be coupled to network 1010 via AP 1031. In one or more embodiments, network 1010 can be coupled to network 1014 via NMD 1020.

In one or more embodiments, NMD 1020 can provide authentication, quality of service (QoS), communication traffic shaping, and/or access control from one or more computing devices (e.g., MSDs 1040-1042) coupled to network 1010 through one of APs 1030 and 1031 to network 1014. For example, NMD 1020 can include an access control list that can be modifiable, and NMD 1020 can use the access control list to permit and/or deny access of one or more computing devices (e.g., MSDs 1040-1042) to network 1014. In one or more embodiments, NMD 1020 can perform one or more processes and/or methods that can modify the access control list. In one or more embodiments, NMD 1020 can receive one or more signals from a remote signaling device, and the access control list of NMD 1020 can be modified based on the received one or more signals from the remote signaling device. In one or more embodiments, signals and/or signaling can be used in communicating establishment and/or control of communications and/or access to a network and/or resources of the network. In one or more embodiments, signals and/or signaling can be used between two different network providers or between two systems of a single network provider. In one example, a first network provider can be or include a second network provider, and signals and/or signaling can be used between the first network provider and the second network provider can mean signaling between two systems of the first network provider. In one or more embodiments, signals and/or signaling can be used to convey information (e.g., configuration messages, accounting messages, control data, etc.) that is different than user information transfer (e.g., a telephone conversation between two users, a text message communication between two users, etc.).

In one or more embodiments, network 1010 and/or network 1014 can include a wired network, a wireless network or a combination of wired and wireless networks. Network 1010 and/or network 1014 can include and/or be coupled to various types of communications networks, such as a public switched telephone network (PSTN), an Internet, a wide area network (WAN) (e.g., a private WAN, a corporate WAN, a public WAN, etc.), a local area network (LAN). In one or more embodiments, NMD 1020 can be coupled to a PSTN, e.g., Ethernet cable and DSL; a cable (television) based network; a satellite-based system; and/or a fiber based network; among others. In one or more embodiments, network 1010 and/or network 1014 can include one or more wireless networks, e.g., based on IEEE 802.11 and/or IEEE 802.16. For instance, one or more of APs 1030 and 1031 can be coupled to network 1010 in a wireless fashion. Network 1010 and/or network 1014 can include one or more DSL (digital subscriber line) and/or cable (e.g., cable television) networks and/or infrastructures. For example, network 1010 and/or network 1014 can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, network 1014 may form part of the Internet, or may couple to other networks, e.g., other local or wide area networks such as the Internet. In one or more embodiments, NMD 1020 can be a system operable to include one or more of network 1010, AP 1030, AP 1031, and/or various networking equipment, among others.

In one or more embodiments, AP 1030 can be a wired AP or a wireless AP. In one example, a wired AP can communicate with one or more computing devices (e.g., MSDs 1040-1045) in a wired fashion. For instance, a wired AP can communicate with one or more computing devices (e.g., MSDs 1040-1045) using wired Ethernet. In another example, a wireless AP communicate with one or more computing devices (e.g., MSDs 1040-1045) in a wireless fashion. For instance, a wired AP can communicate with one or more computing devices (e.g., MSDs 1040-1045) using one or more of Institute of Electrical and Electronics Engineers (IEEE) 802.16, IEEE 802.11 (wireless Ethernet), IEEE 802.15 (Bluetooth), ultra wide band, and/or infrared communication technologies, among others. In one or more embodiments, a wireless access point can include a transceiver to communicate with one or more computing devices using one or more wireless methods, processes, and/or protocols.

In one or more embodiments, each mobile subscriber device (MSD) of MSDs 1040-1045 can include and/or can be coupled to one or more transceivers that allow the MSD to communicate with network 1013 and an AP of APs 1030-1033. For example, MSD 1040 can include or be coupled to a first transceiver that can communicate with network 1013 and include or be coupled to a second transceiver to communicate with AP 1030. In this fashion, MSD 1040 can obtain an access code from network 1013, send the access code to NMD 1020 via AP 1030, and access network 1014 via NMD 1020, if the access code is valid and/or authenticated. For instance, MSD 1040 can include or be coupled to a first transceiver that can communicate with a cellular telephone tower of or coupled to network 1013 and include or be coupled to a second transceiver, such as a wireless Ethernet transceiver, to communicate with AP 1030.

As shown, MSDs 1043 and 1044 can be at a location 1051 and can be coupled to an AP 1032 which can be coupled to a network 1011 that can be coupled to a NMD 1021. As also shown, MSD 1045 can be at a location 1052 and can be coupled to an AP 1033 which can be coupled to a network 1012 that can be coupled to a NMD 1022. As illustrated, network management devices (NMDs) 1020-1022 can be coupled to network 1014. In one or more embodiments, NMDs 1020-1022 can provide access control between respective networks 1010-1012 and network 1014. In one or more embodiments, NMDs 1021 and 1022 can include and/or implement one or more structures and/or one or more functionalities described with reference to NMD 1020. In one or more embodiments, APs 1031-1033 can include and/or implement one or more structures and/or one or more functionalities described with reference to AP 1030. In one or more embodiments, networks 1011 and 1012 can include and/or implement one or more structures and/or one or more functionalities described with reference to network 1010. In one or more embodiments, locations 1050-1052 can include one or more of hotels, airports, restaurants, and coffee shops, among others.

Figure 2:
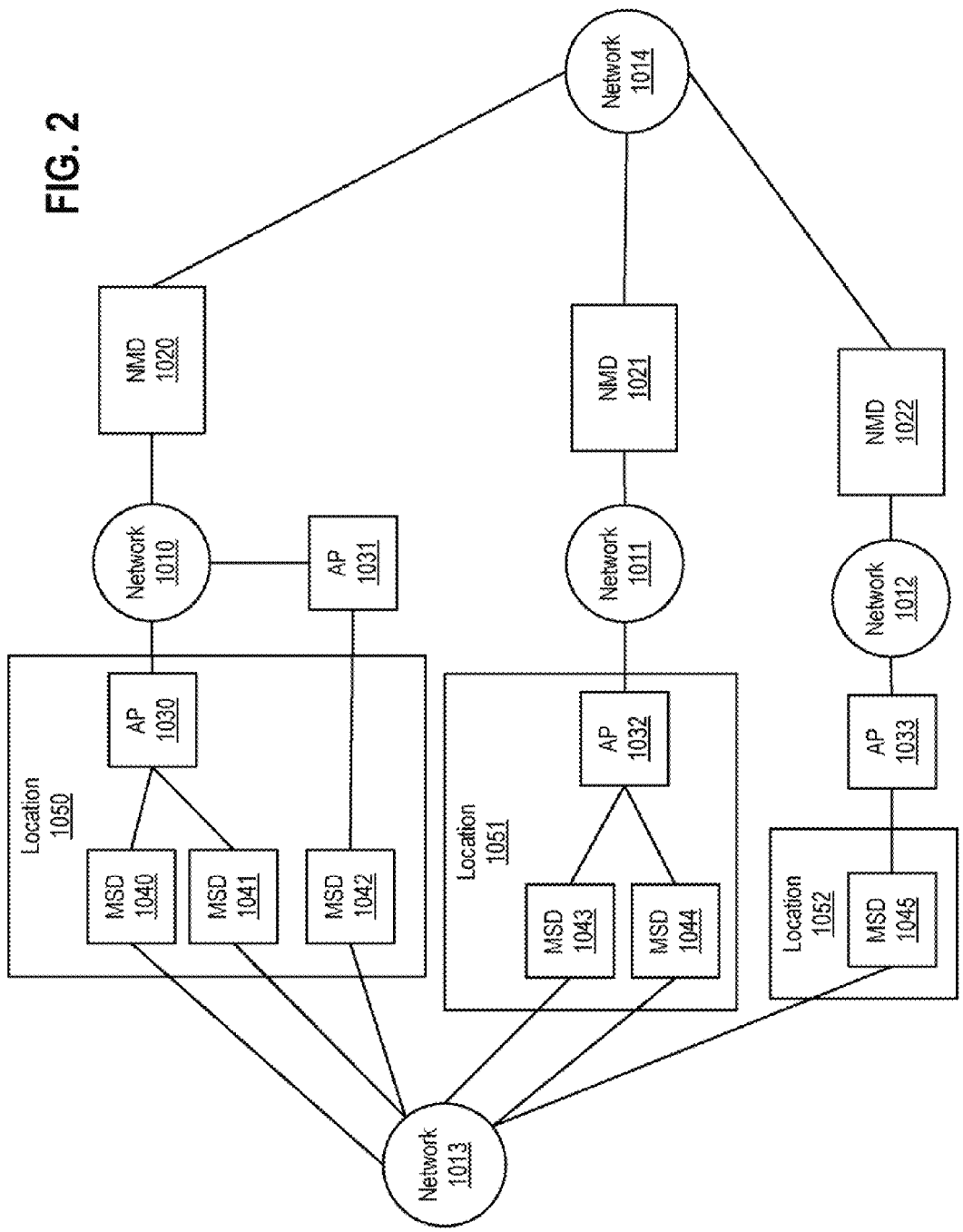
FIG. 2 provides a block diagram of a network communication system, according to one or more embodiments.

Turning now to FIG. 2, a block diagram of one or more network communications systems, according to one or more embodiments. Each of the elements illustrated in FIG. 2 is described with reference to FIG. 1. As illustrated, APs 1030 and 1032 can be at respective locations 1050 and 1051. In one or more embodiments, one or more locations of one or more of APs 1030-1033 can be stored in a database, and a location of a computing device coupled to an AP can determined using the location of the AP. For example, AP 1030 may have a limited range in which a computing device can communicate with AP 1030. For instance, AP 1030 may communicate with a computing device using wireless Ethernet which may be limited to communicating with the computing device when the computing device is within some number (e.g., tens or hundreds) of feet. For example, the database can store a location associated with location 1050 for AP 1030, and the location associated with location 1050 can be used to determine one or more locations for one or more of MSDs 1040 and 1041 communicating with AP 1030. For instance, if MSD 1040 is communicating with AP 1030, then it can be determined that MSD is at location 1050.

Figure 3:
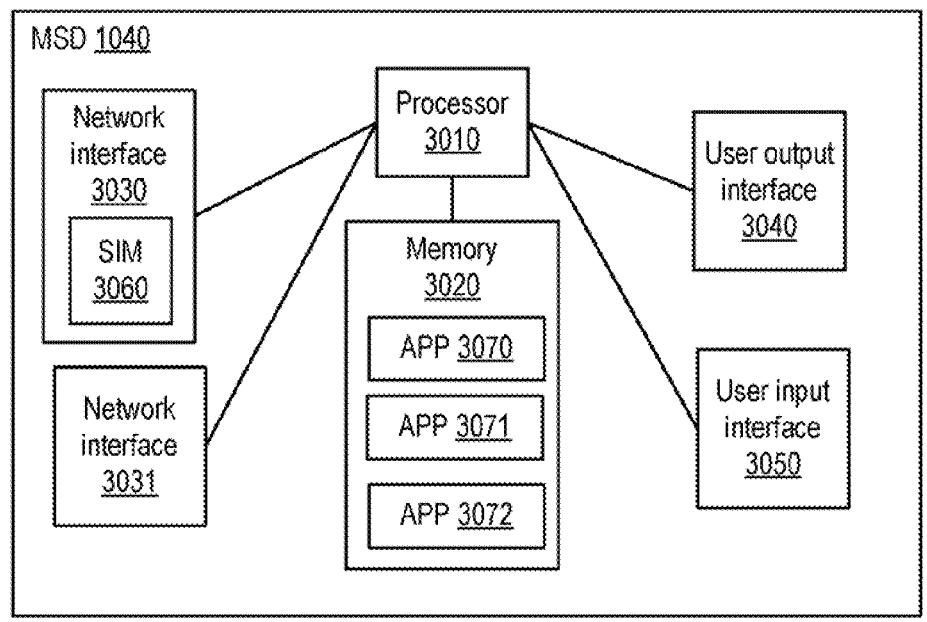
FIG. 3 provides a block diagram of a mobile subscriber device, according to one or more embodiments.

Turning now to FIG. 3, a block diagram of a mobile subscriber device is illustrated, according to one or more embodiments. As shown, MSD 1040 can include a memory coupled to a processor 3010, and MSD 1040 can include network interfaces 3030 and 3031, user output interface 3040, and user input interface 3050 coupled to processor 3010. In one or more embodiments, memory 3020 can include one or more applications (APPs) 3070-3072 that can include instructions executable by processor 3010 to implement one or more methods and/or one or more systems associated with MSD 1040. In one or more embodiments, MSD 1040 may be any of various types of devices, including a computer system, such as a portable computer, a personal digital assistant (PDA), a mobile telephone (e.g., a cellular telephone, a satellite telephone, etc.), a wearable computing device, an Internet appliance, a communications device, or other wired or wireless device.

In one or more embodiments, user output interface 3040 can be used to convey information (e.g., text, graphic, video, audio, etc.) to a user of MSD 1040. For example, MSD 1040 may include a display (e.g., a display screen) that can be used to convey text, graphic, and/or video to a user of MSD 1040. In one or more embodiments, user input interface can be used to receive user input from a user of MSD 1040. In one example, MSD 1040 may include a keyboard that can be used to receive user input from a user of MSD 1040. In another example, MSD 1040 may include a one or more sensors that can be used to receive user input from a user of MSD 1040. In one instance, one or more sensors can include resistive sensors that can be used to determine one or more positions on a display screen. In another instance, one or more sensors can include capacitive sensors that can be used to determine one or more positions on a display screen. In one or more embodiments, user output interface 3040 and user input interface can be used to implement a keyboard. For example, user output interface 3040 can be used to present a graphic of a keyboard, and user input interface 3050 can receive a position of user input on the graphic of the keyboard to determine a received key of the keyboard.

In one or more embodiments, network interface 3030 can be used to couple MSD 1040 to network 1013, and MSD 1040 can use network interface 3030 to communicate information (e.g., data, voice data, etc.) with network 1013. For example, network interface 3030 can include a transceiver that is operable to communicate information with network 1013. In one or more embodiments, network interface 3030 can include a subscriber identity module (SIM) 3060. In one or more embodiments, SIM 3060 can securely store an international mobile subscriber identity (IMSI) which can include a unique number and/or identity associated with a global system for mobile communications (GSM) network and/or a universal mobile telecommunications system (UMTS) network. In one example, the unique number and/or identity can be used to determine information corresponding to MSD 1040 from a home location register (HLR) and/or from a visitor location register (VLR). In one or more embodiments, a MSISDN (mobile subscriber ISDN (integrated services digital network) number, mobile station international ISDN number(s), or mobile international ISDN number) can be a number that can uniquely identify a subscription in a GSM mobile network and/or a UMTS (universal mobile telecommunications system) mobile network. For example, the MSISDN can include a telephone number corresponding to SIM 3060. In one instance, the MSISDN can include a country code, a national destination code, and a subscriber number. In another instance, the MSISDN can include a country code, a number planning area, and a subscriber number.

In one or more embodiments, SIM 3060 can be embodied in a removable card (e.g., a SIM card) that can be removed from a first MSD associated with a first subscriber account and placed in a second MSD, so that the second MSD can be associated with the first subscriber account. For example, SIM 3060 embodied as a SIM card can be associated with a first subscriber account and used in MSD 1040, thereby associating MSD 1040 with the first subscriber account; SIM 3060 can be removed from MSD 1040, thereby disassociating MSD 1040 with the first subscriber account; and SIM 3060 can be placed in MSD 1041, thereby associating MSD 1041 with the first subscriber account.

In one or more embodiments, network interface 3031 can be used to communicate with an AP. For example, network interface 3031 can be used to communicate with AP 1030. In one or more embodiments, network interface 3031 can include a transceiver that is operable to communicate information with AP 1030.

Figure 4:
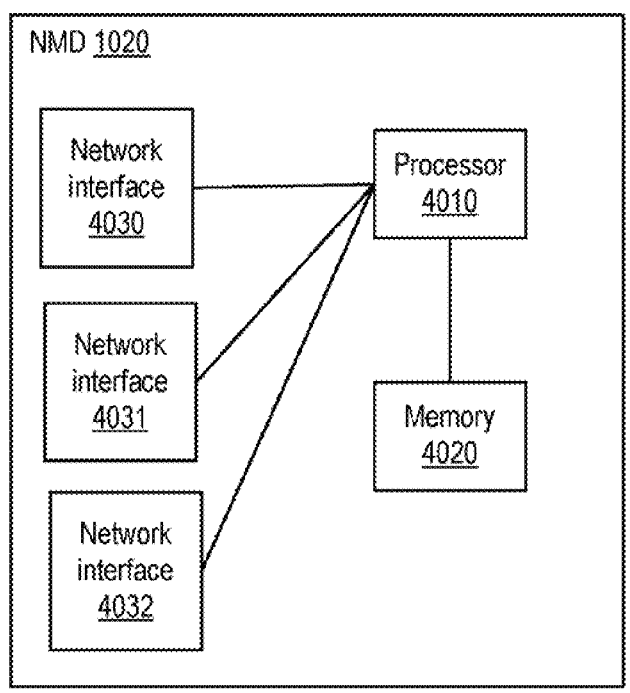
FIG. 4 provides a block diagram of a network management device, according to one or more embodiments.

Turning now to FIG. 4, a block diagram of a network management device is illustrated, according to one or more embodiments. As illustrated, NMD 1020 can include a processor 4010, and NMD 1020 can include a memory 4020 and one or more network interfaces 4030-4032 coupled to processor 4010. In one example, network interface 4030 can be coupled to network 1010 and network interface 4031 can be coupled to network 1014. For instance, network interface 4031 can be coupled to a routing computing device that is coupled to network 1014. In one example, NMD 1020 can control access to and/or services of network 1014 using network interfaces 4030 and 4031. In one or more embodiments, network interface 4032 can be coupled to a private network. For instance, the private network can provide network access and/or services to one or entities associated with location 1050.

In one or more embodiments, the term "memory" can mean a "memory medium" and/or "computer readable medium" which is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium can include other types of memory as well, or combinations thereof. In one or more embodiments, the memory medium can be and/or include an article of manufacture and/or a software product. In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, personal digital assistant (PDA), laptop, mobile telephone, mobile multimedia device, embedded computer system, television system, and/or other device. In general, the terms "computing device", "computer", and/or "computer system" can be broadly defined to encompass any device having a processor which executes instructions from a memory medium.

The memory medium in one or more systems thus can store a software program and/or data for performing and/or enabling access and/or selective network access and/or network service. A CPU or processing unit in one or more systems executing code and data from a memory medium includes a means for executing one or more software program according to the methods and/or flowcharts described herein.

Figure 5:
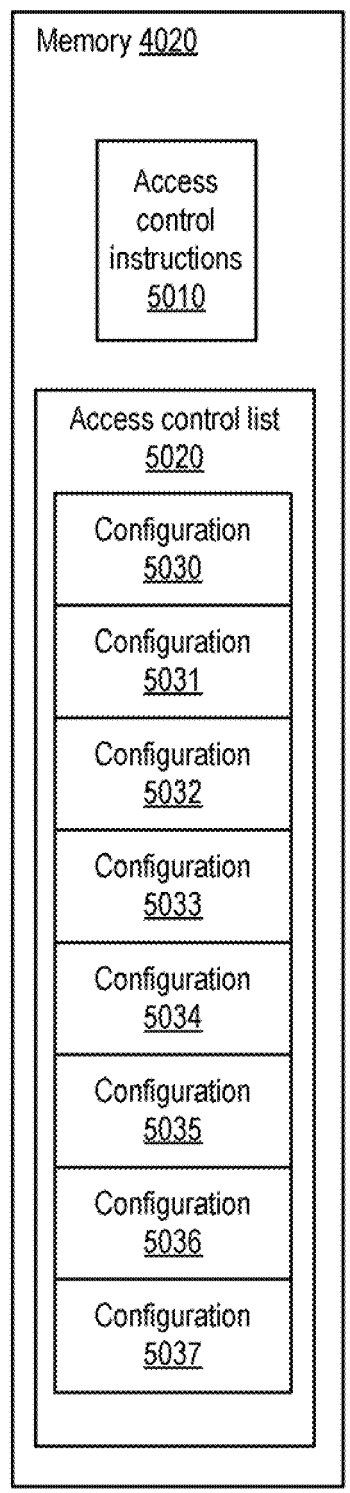
FIG. 5 provides a block diagram of a memory of a network management device, according to one or more embodiments.

Turning now to FIG. 5, a block diagram of a memory of a network management device is illustrated, according to one or more embodiments. As shown, memory 4020 can include access control instructions 5010 that can be executed on processor 4010. For example, access control instructions 5010 that can be executed on processor 4010 to control access to and/or services of network 1014 for computing devices coupled to network 1010. As illustrated, memory 4020 can include an access control list (ACL) 5020. In one or more embodiments, ACL 5020 can be used by NMD 1020 to control access to and/or services of network 1014 for computing devices coupled to network 1010.

In one or more embodiments, ACL 5020 can be used by access control instructions 5010 executed on processor 4010 to control outbound network access (e.g., access from network 1010 to network 1014) and/or inbound network access (e.g., access from network 1014 to network 1010) using source and/or destination network addresses. For example, ACL 5020 can be used to control outbound network access and/or inbound network access on a packet level (e.g., on a per packet basis). In one or more instances, ACL 5020 can be used to control outbound network access and/or inbound network access on one or more of an IP packet level, a transmission control protocol (TCP) packet level, and/or a user datagram protocol (UDP) packet level.

As shown, ACL 5020 can include one or more configurations 5030-5037. For example, configuration 5030 can be associated with one or more network addresses (e.g., IP addresses, MAC addresses, etc.), and configuration 5030 can include data that can be used to control access of MSD 1040 to network 1014. In one or more embodiments, configuration 5030 can include one or more data structures that can be used to store and/or retrieve the data that can be used to control access of MSD 1040 to network 1014.

Turning now to FIG. 6, a block diagram of an access control list configuration is illustrated, according to one or more embodiments. As illustrated, configuration 5030 can include source address information 6010-6015 that corresponds to respective destination information 6020-6027 that corresponds to respective service information 6030-6035 that corresponds to respective direction information 6040-6045 that corresponds to respective permission information 6050-6055. In one or more embodiments, source address information 6010-6015 and destination information 6020-6025 can be used to control outbound network access (e.g., access from network 1010 to network 1014) and/or inbound network access (e.g., access from network 1014 to network 1010).

In one example, source address information 6010 can store address information associated with MSD 1040, and direction information 6040 can indicate an outbound traffic direction (e.g., outbound from network 1014 to network 1010). In one instance, source address information 6010 can store IP address information associated with MSD 1040. In another instance, source address information 6010 can store MAC address information associated with MSD 1040. In another example, destination address information 6020 can store address information associated one or more network addresses of network 1014. In one instance, destination address information 6020 can store IP address information. For example, address information 6020 can include a range of addresses, such as a subnet (e.g., 216.12.254.128/25) and/or addresses 216.9.25.3 through 216.10.25.5, a single network address, such as 216.12.254.7, and/or a set of addresses, such as {216.12.254.4, 209.191.93.52, 216.12.252.42, 96.17.249.145}, among others. In one or more embodiments, MSD 1040 can access network addresses of network 1014 that are associated with destination address information 6020. In one or more embodiments, destination address information 6020 can store information that indicates that MSD 1040 is not restricted to any particular network address of network 1014. For example, destination address information may store 0.0.0.0 to indicate that MSD 1040 is not restricted to any particular network address of network 1014.

In one or more embodiments, service information 6030 can be used to control one or more services associated with source address information 6010 and/or destination address information 6020. In one or more examples, service information 6030 can indicate one or more services of email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, these one or more services can be associated with and/or correspond to one or more protocols of one or more computer and/or software applications.

In one or more embodiments, a service can be associated with a port (e.g., a port number). For example, a world wide web service using a hypertext transfer protocol (HTTP) can use port 80. For instance, the HTTP can be used with a transmission control protocol (TCP) that can use port 80. In one or more embodiments, "well known ports" can be those from 0 through 1023, "registered ports" can be those from 1024 through 49151, and/or "dynamic and/or private ports" can be those from 49151 through 65535. More information regarding port numbers can be found in Request for Comment (RFC) 1700 maintained by a working group of the Internet Engineering Task Force (IETF), a standards organization for the Internet.

In one or more embodiments, service information 6030 can indicate that any service can be used with source address information 6010 and/or destination address information 6020. In one or more embodiments, service information 6030 can indicate that specific one or more services can be used with source address information 6010 and/or destination address information 6020. In one example, service information 6030 can indicate that a domain name service can be used with source address information 6010 and/or destination address information 6020. In another example, service information 6030 can indicate that a world wide web service can be used with source address information 6010 and/or destination address information 6020.

In one or more embodiments, destination address information 6021 can store address information associated with MSD 1040, and direction information 6041 can indicate an inbound traffic direction (e.g., inbound from network 1014 to network 1010). In one instance, destination address information 6021 can store IP address information associated with MSD 1040. In another instance, destination address information 6021 can store MAC address information associated with MSD 1040. In one example, source address information 6011 can store address information associated one or more network addresses of network 1014. In one instance, source address information 6011 can store IP address information. For example, address information 6011 can include a range of addresses, such as a subnet (e.g., 216.12.254.128/25) and/or addresses 216.9.25.3 through 216.10.25.5, a single network address, such as 216.12.254.7, and/or a set of addresses, such as {216.12.254.4, 209.191.93.52, 216.12.252.42, 96.17.249.145}, among others. In one or more embodiments, one or more computer systems with associated with source address information 6011 can communicate with MSD 1040. In one or more embodiments, source address information 6011 can store information that indicates that one or more computer systems associated with addresses of network 1014 are not restricted to any particular network address of network 1014. For example, source address information 6011 may store 0.0.0.0 to indicate that one or more computer systems associated with addresses of network 1014 are not restricted to any particular network address of network 1014.

In one example, service information 6031 can indicate a VoIP service. For instance, source address information 6011, destination address information 6021, service information 6031, and direction information 6041 can be used to control access of the VoIP service to MSD 1040. For example, source address information 6011, destination address information 6021, service information 6031, and direction information 6041 can be used to control incoming VoIP calls to MSD 1040.

In one or more embodiments, NMD 1020 can use permission information 6050 to control whether or not source address information 6010, destination address information 6020, service information 6030, and direction information 6040 and can use permission information 6051 to control whether or not source address information 6011, destination address information 6021, service information 6031, and direction information 6041. In the fashion described above, NMD 1020 can control access to/from and/or services of network 1014 for computing devices coupled to network 1010 by controlling control access to/from and/or services corresponding to one or more network addresses of network 1014, according to one or more embodiments. In one or more embodiments, NMD 1020 and/or another computer system coupled to network 1014 can modify configuration 5030 to control access to/from and/or services of network 1014 for computing devices coupled to network 1010 by using NMD 1020 and ACL 5020 to control access to/from and/or services corresponding to one or more network addresses of network 1014. In one or more embodiments, one or more portions of ACL 5020 can be stored in a first data structure. In one or more embodiments, one or more portions of ACL 5020 can be used to populate a second data structure. For example, the second data structure can be populated with information from ACL 5020 in a fashion usable by access control instructions 5010 when executed by processor 4010. In one or more embodiments, the second data structure can be considered an access control list.

In one example, NMD 1020 can permit MSD 1040 access to some services and/or network addresses of network 1014 using ACL 5020 and can modify ACL 5020 to permit MSD 1040 access to additional services and/or network addresses of network 1014. For instance, NMD 1020 can permit MSD 1040 to access a "walled garden" that can include access to one or more domain name services (e.g., provided by one or more domain name servers) and/or one or more web servers (e.g., one or more web servers that can perform network access services, one or more web servers that can provide information regarding location 1050, etc.). In one or more embodiments, a configuration of ACL 5020 can include the walled garden.

In a second example, MSD 1040 can be permitted access to some services and/or network addresses of network 1014, and NMD 1020 can reduce or eliminate access to one or more services and/or network addresses of network 1014 using ACL 5020 by modifying ACL 5020 to reduce or eliminate access to one or more services and/or network addresses of network 1014 previously permitted to MSD 1040. In one or more embodiments, NMD 1020 can receive one or more signals from a remote computing device and can, in response, permitted additional access or reduce or eliminate access to some services and/or network addresses of network 1014. For example, NMD 1020 can receive the one or more signals via network 1014.

Figure 7:
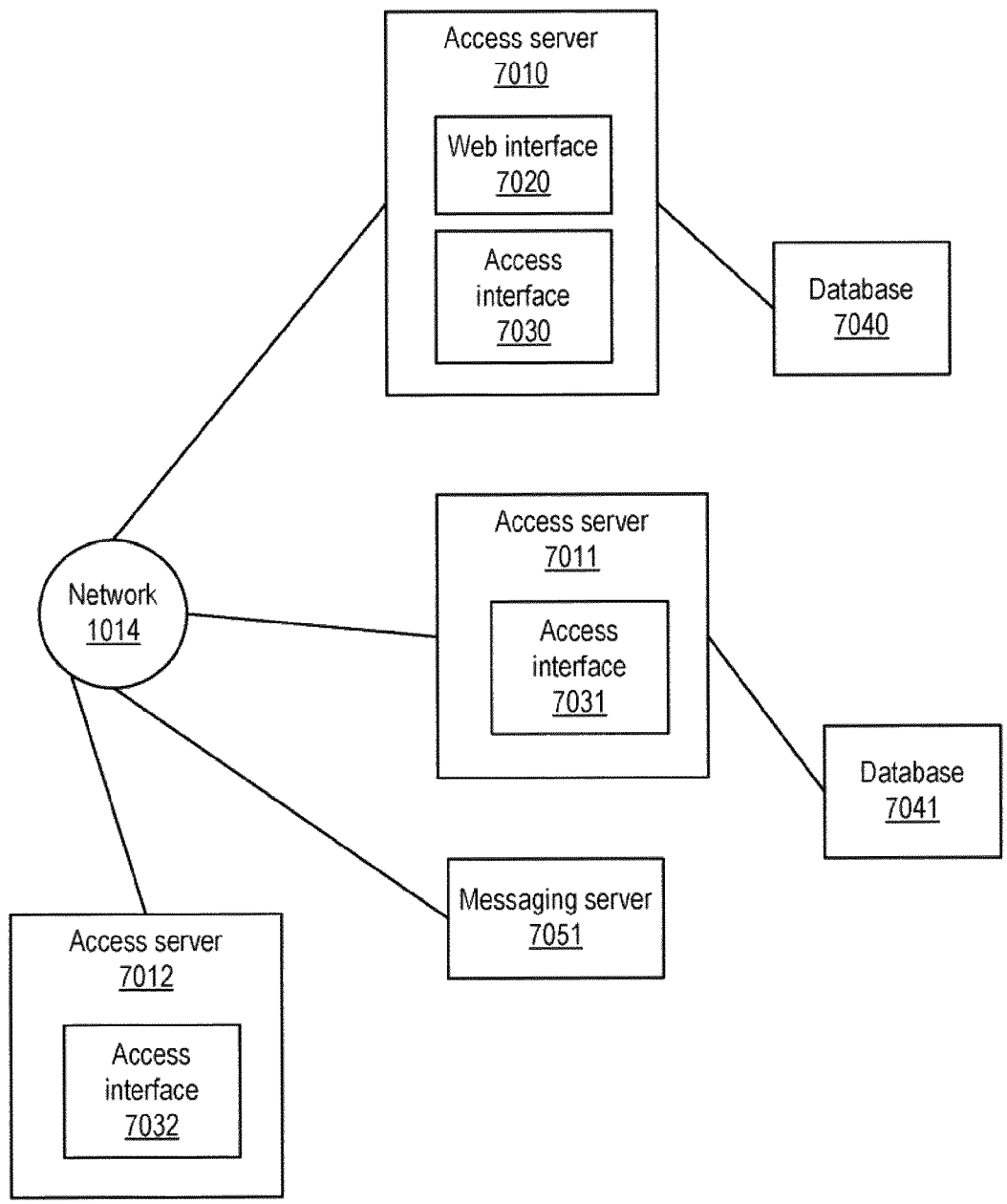
FIG. 7 provides a block diagram of access servers coupled to a network, according to one or more embodiments.

Turning now to FIG. 7, a block diagram of access servers coupled to a network is illustrated, according to one or more embodiments. As shown, access servers 7010-7012 can be coupled to network 1014. In one or more embodiments, access server 7010 can be operated by a first network provider, access server 7011 can be operated by a second network provider, and/or access server 7012 can be operated by a third network provider. In one or more embodiments, one or more of access servers 7010-7012 can provide and/or implement one or more of authentication, authorization, and accounting (AAA) services. In one or more embodiments, an authentication service can include a process and/or method of verifying an identity (e.g., an identity of a device, an identity of a user of a device, etc.). For example, one or more of a username, a password, and a telephone identification (e.g., an IMSI, a MSISDN, a portion of a MSISDN, etc.), among others, can be used to verify an identity of a device, an identity of a user of a device, etc. In one or more embodiments, an authorization service can include a process and/or method of determining what a authenticated device and/or authenticated user of a device can use, access, do, and/or perform. In one or more embodiments, an accounting service can include accounting, measuring, and/or documenting one or more resources used by a device and/or user of a device during access to services available to a device and/or user of a device through an authorization service.

In one or more embodiments, one or more of access servers 7010-7012 can include one or more interfaces. For example, the one or more interfaces can include one or more a RADIUS (remote access dialin user service) interface, a DIAMETER (an extension and improvement of RADIUS) interface, and a web interface. Other services for providing one or more of authentication, authorization, and accounting services may include EAP (Extensible Authentication Protocol), TACACS (Terminal Access Controller Access Control System), TACACS+, XTACAS, IEEE 802.1x, WPA (wifi protected access), and/or IEEE 802.11i, among others, and one or more interfaces can be used for these services. In one or more embodiments, these may also be used for applications, such as access to network service or IP mobility, and are intended to work in both local AAA and roaming situations.

In one or more embodiments, a first interface and a second interface of the one or more interfaces can interact with each other. For example, access server 7010 can include a web interface 7020 (e.g., a web server) and an access interface 7030 (e.g., a RADIUS server). The web interface can accept identification information from a web browser (e.g., a web browser executed on MSD 1040) and provide the identification information to access interface 7030, where access interface 7030 can perform an authentication service. In one or more embodiments, a computing device (e.g., MSD 1040) and web interface 7020 can communicate using a HTTP and/or a secure HTTP (HTTPS).

In one or more embodiments, access interface 7030 can use a database 7040 in performing the authentication service. In one example, database 7040 can store multiple username and password pairs. In another example, database 7040 can include one of a HLR and a VLR. In one or more embodiments, access interface 7030 can proxy a received access request. For example, the access request can include an authentication request and/or an authorization request. For one instance, access interface 7030 can include a first RADIUS server, and the first RADIUS server can proxy one or more of a received authentication request and a received authorization request to access interface 7031 (e.g., a second RADIUS server). For a second instance, access interface 7032 can proxy a received access request. For example, the access request can include an authentication request and/or an authorization request. For one instance, access interface 7032 can include a third RADIUS server, and the third RADIUS server can proxy one or more of a received authentication request and a received authorization request to access interface 7031 (e.g., a second RADIUS server).

In one or more embodiments, access interface 7031 can use a database 7041 in performing one or more of an authentication service and an authorization service. In one example, database 7041 can store multiple username and password pairs. In another example, database 7041 can include one of a HLR and a VLR. As illustrated, access servers 7010 and 7011 can be coupled to respective databases 7040 and 7041. In one or more embodiments, access servers 7010 and 7011 can include respective databases 7040 and 7041.

As illustrated, a messaging server 7051 can be coupled to network 1014. In one or more embodiments, messaging server 7051 can receive a request to send a message to a computing device (e.g., MSD 1040) and, in response to the request, send the message to the computing device. In one example, messaging server 7051 can send a text message to the computing device. For instance, messaging server 7051 can send the text message to the computing device via a short message service (SMS). In one or more embodiments, messaging server 7051 can receive one or more requests to send one or more message via a short message peer-to-peer (SMPP) protocol. For example, the SMPP protocol can permit and/or enable third-parties to submit and/or transmit one or more SMS messages (e.g., one or more text messages via SMS) to one or more subscriber devices (e.g., one or more of MSDs 1040-1045) of a network provider. For instance, access server 7010 (e.g., operated by the first network provider) can send a text message to MSD 1040 using messaging server 7051 which can be operated by the second network provider. For example, MSD 1040 can be a mobile subscriber device of the second network provider, and the first network provider can send one or more text messages to MSD 1040 using messaging server 7051.

In one or more embodiments, various computing devices described herein can communicate using one or more secure communications. For example, a first computing device can communicate with a second computing device using one or more of transport layer security (TLS), HTTPS, a virtual private network (VPN), IPsec, and/or a secure socket layer (SSL), among others.

Figure 8B:
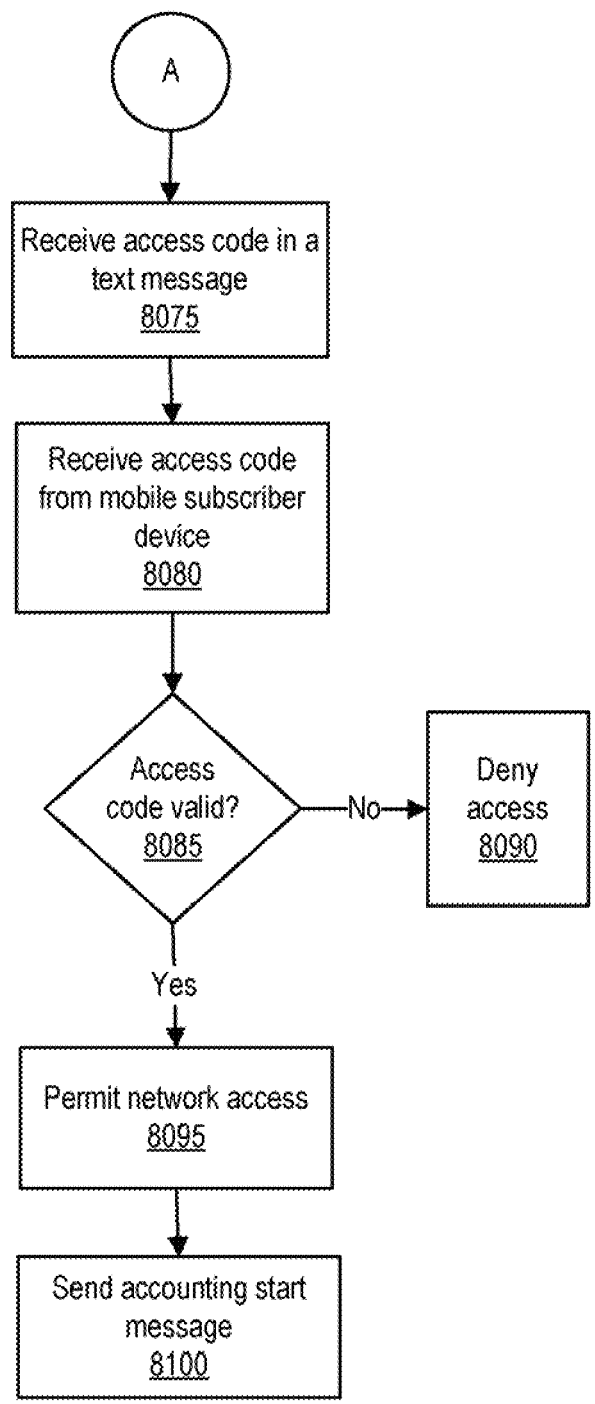

Turning now to FIGS. 8A and 8B, a method for accessing a network is illustrated, according to one or more embodiments. At 8010, a request, from a computing device, for access to a second network coupled to a first network can be received. For example, NMD 1020 can receive a request for access of network 1014 (e.g., the second network) from MSD 1040 coupled to network 1010 (e.g., the first network) via AP 1030. For instance, NMD 1020 can receive, from MSD 1040, a request for a web page of a computer system coupled network 1014. At 8015, it can be determined whether or not access to the second network is permitted. In one or more embodiments, one or more source network addresses, one or more destination addresses, and/or one or more services associated with the request can be used in to determine whether or not access to the second network is permitted. For example, NMD 1020 can use ACL 5020 to determine whether or not the network access request from MSD 1040 is permitted. In one or more embodiments, ACL 5020 can be configured to allow MSD 1040 access to one or more network addresses and/or one or more services associated with network 1014. For example, MSD 1040 can be allowed to access a domain name service (DNS) of network 1014. In one instance, MSD 1040 can be permitted to access a DNS server operated by the first network provider. In another instance, MSD 1040 can be permitted to access web interface 7020 of access server 7010. In one or more embodiments, ACL 5020 can be configured to not permit (e.g., deny) access to other one or more network addresses and/or one or more services associated with network 1014. If access to the second network is permitted, the method can proceed to 8020, where access to the second network is permitted.

If access to the second network is not permitted, the method can proceed to 8025, where information can be sent to the computing device. In one or more embodiments, the information sent to the computing device can include a web page. For example, the web page can include information and/or inputs that can be used to authenticate and/or authorize the computing device access to the second network. In one or more embodiments, the request received at 8010 can include information that indicates an application executing on the computing device that sent the request. In one example, a web browser executing on MSD 1040 can send information in the request that can be used to identify the web browser executing on MSD 1040. For instance, the web browser executing on MSD 1040 can send a string identifying the web browser. For example, the string can be included in user agent information.

In one or more embodiments, user agent information can be used to identify an application, such as a web browser, and can be used to transmit information to the application based on the user agent information. For example, the user agent information can indicate a specific web browser, and information based one the specific web browser can be sent to the web browser. In one instance, the user agent information can indicate that the web browser is used with a Braille reader, and a web page that does not include graphical information can be sent to the web browser. In a second instance, the user agent information can indicate a type of web browser, such as Microsoft's Internet Explorer, Mosaic, Netscape Navigator, Firefox, Safari, Opera, etc. In another instance, the user agent information can indicate a type operating system, a preferred language (e.g., English, Spanish, Russian, French, Italian, etc.) and/or a type of computing device (e.g., mobile telephone, smartphone, PDA, laptop, netbook, etc.). In one or more embodiments, a web page that is specific to MSD 1040 (e.g., based on one or more of device type, operating system type, and browser type, among others) can be sent to MSD 1040 at 8025. For example, the web page that is specific to MSD 1040 can include one or more inputs for one or more of a telephone number, a credit card number, a username, and a password. In one or more embodiments, information specific to an application executing on MSD 1040 can be sent to MSD 1040 at 8025.

At 8030, first identification information can be received. For example, the first identification information can be received through AP 1030 operated by the first network provider, where the first access point is coupled to MSD 1040 associated with the second network provider. In one instance, the mobile subscriber device can be coupled to the first access point in a wired fashion. In another instance, the mobile subscriber device can be coupled to the first access point in a wireless fashion. In one or more embodiments, a computing device operated by the first network provider can receive the first identification information. In one example, NMD 1020 can receive the first identification information from MSD 1040. In another example, web interface 7020 of access server 7010 can receive the first identification information from MSD 1040. In one or more embodiments, NMD 1020 can include one or more structures and/or one or more functionalities associated with access server 7010.

In one or more embodiments, the first identification information can be information of SIM 3060 of MSD 1040. For example, the first identification information can be received from an application executing on MSD 1040, where the application can access information of SIM 3060 and send information of SIM 3060 to the first network provider. In one or more embodiments, the first identification information can include information inputted by a user of MSD 1040. For example, the user can input a telephone number of MSD 1040 into an application executing on MSD 1040 and the application can send the telephone number to the first network provider. For instance, the user can input the telephone number of MSD 1040 into a web browser executing on MSD 1040.

At 8035, the first identification information can be sent to the second network provider. For example, the first identification information can be sent to access interface 7031 of access server 7011 which can be operated by the second network provider. In one instance, NMD 1020 can send the first identification information to access interface 7031 of access server 7011 operated by the second network provider. In another instance, access interface 7030 of access server 7010 can send the first identification information to access interface 7032 of access server 7012, and access interface 7032 can proxy the first identification information to access interface 7031. In one or more embodiments, web interface 7020 can use access interface 7030 to send the first identification information to access interface 7031 of access server 7011.

At 8040, it can be determined whether or not MSD 1040 is authorized for access to the second network (e.g., network 1014). In one or more embodiments, an authorization service of access server 7011 can determine whether or not MSD 1040 is authorized for access to the second network. For example, the first identification information can be associated with an account associated with MSD 1040, and the authorization service of access server 7011 can access account information of the account associated with MSD 1040 to determine whether or not MSD 1040 is authorized for access to the second network. In one instance, a determination of whether or not MSD 1040 is authorized for access to the second network can include determining whether or not the account is in good standing (e.g., no overdue payments are due to the second network provider, no over usage, etc.). In another instance, a determination of whether or not MSD 1040 is authorized for access to the second network can include determining whether or not the account includes a feature, such as using the first network provider to provide access to the second network.

If MSD 1040 is authorized for access to the second network, the method can proceed to 8045, where the second network provider can send a response, to the first network provider, indicating that MSD 1040 is authorized for access to the second network. In one example, access server 7011 can send the response, to access server 7010, indicating that MSD 1040 is authorized for access to the second network. In another example, access server 7011 can send the response, to NMD 1020, indicating that MSD 1040 is authorized for access to the second network.

If MSD 1040 is not authorized for access to the second network, the method can proceed to 8050, where the second network provider can send a response, to the first network provider, indicating that MSD 1040 is not authorized for access to the second network. In one example, access server 7011 can send the response, to access server 7010, indicating that MSD 1040 is not authorized for access to the second network. In another example, access server 7011 can send the response, to NMD 1020, indicating that MSD 1040 is not authorized for access to the second network.

At 8055, the response from the second network provider can be received. At 8060, it can be determined whether or not MSD 1040 is permitted to access the second network, based on the response received from the second network provider that indicates whether or not MSD 1040 is authorized to access the second network. If the response indicates that MSD 1040 is not authorized to access the second network, access to the second network can be denied at 8065. In one or more embodiments, denying access to the second network can include maintaining one or more portions of ACL 5020 that are associated with MSD 1040. For example, MSD 1040 may still access the walled garden described above and not be permitted to access further resources of network 1014.

If the response indicates that MSD 1040 is authorized to access the second network, the method can proceed to 8070, where an access code can be sent to MSD 1040. In one or more embodiments, the access code can be automatically and/or dynamically generated prior to being sent to MSD 1040. In one example, access server 7010 can send the access code to MSD 1040. In another example, NMD 1020 can send the access code to MSD 1040. In one or more embodiments, access server 7010 and/or NMD 1020 can use messaging server 7051 to send the access code to MSD 1040. For example, messaging server 7051 can send the access code, to MSD 1040, in a text message. In one or more embodiments, the text message can include a uniform resource locator (URL) that includes the access code. In one example, the URL may include a form similar to:
http://NMD1020.FirstNetworkProvider.com/ access?AccessCode=acbd18db4cc2, if NMD 1020 is to receive the access code. In second example, the URL may include a form similar to:
http://AccessServer7010.FirstNetworkProvider.com/ access?AccessCode=acbd18db4cc2, if access server 7010 is to receive the access code. In a third example, the URL may include a form similar to: http:// NMD1020.FirstNetworkProvider.com/acbd18db4cc2, if NMD 1020 is to receive the access code. In another example, the URL may include a form similar to:
http://AccessServer7010.FirstNetworkProvider.com/ acbd18db4cc2, if access server 7010 is to receive the access code. In one or more embodiments, the URL may include an access code included in a form in accordance with RFC 1738.

In one or more embodiments, an access code can be a substantially unique string of characters. In one example, the substantially unique string of characters may not be used again for a period of time. For instance, the period of time can include one or more of days, weeks, months, and years. In another example, the substantially unique string of characters may be a random or pseudo random string of characters. In one or more embodiments, an access code can be an output or a portion of an output from a hash function (e.g., MD4, MD5, SHA-160, etc.). In one or more embodiments, an access code can be valid for a period of time and/or at a location. In one example, the access code may be valid for a period of twenty-four (24) hours after it is sent. In another example, the access code may be valid at location 1050 and not valid at other one or more locations (e.g., one or more of locations 1051 and 1052).

At 8075, MSD 1040 can receive the access code. For example, MSD 1040 can receive the access code in a text message that was sent using messaging server 7051. At 8080, the first network provider can receive the access code from MSD 1040. In one or more embodiments, the first network provider can receive the access code from MSD 1040 through a web interface. For example, the text message can include a URL that includes the access code, the user can select the URL, MSD 1040 can access the URL, and the first network provider can process one or more portions of the URL at a computer system of the network address associated with the URL. In one example, the computer system of the network address associated with the URL can include access server 7010. In another example, the computer system of the network address associated with the URL can include NMD 1020.

At 8085, it can be determined whether or not the access code is valid. In one or more embodiments, an authentication service of access server 7010 can be used to determine whether or not the access code is valid. For example, NMD 1020 or access server 7010 can determine whether or not the access code is valid. In one or more embodiments, NMD 1020 can determine whether or not the access code is valid, if NMD 1020 receives the access code. In one or more embodiments, a determination of whether or not the access code is valid can be based on a location of MSD 1040. In one example, the access code may be valid at location 1050 and not valid at other one or more locations (e.g., one or more of locations 1051 and 1052). For instance, if MSD 1040 used the access code at one or more of locations 1051 and 1052, it can be determined that the access code is not valid. If the access code is not valid, then the method can proceed to 8090, where access to the second network can be denied. In one or more embodiments, denying access to the second network can include maintaining one or more portions of ACL 5020 that are associated with MSD 1040. For example, MSD 1040 may still access the walled garden described above and not be permitted to access further resources of network 1014.

If the access code is valid, the method can proceed to 8095, where MSD 1040 is permitted to access the second network. In one or more embodiments, permitting MSD 1040 to access the second network can include increasing a number of network addresses and/or services of the second network that MSD 1040 is permitted to access. For example, one or more portions of ACL 5020 can be modified to increase the number of network addresses and/or services of the second network that MSD 1040 is permitted to access. In one or more embodiments, NMD 1020 can modify ACL 5020 to increase the number of network addresses and/or services of the second network that MSD 1040 is permitted to access. In one or more embodiments, NMD 1020 can receive one or more signals and/or a message from a remote computer system (e.g., access server 7010) to increase the number of network addresses and/or services of the second network that MSD 1040 is permitted to access. At 8100, an accounting start message can be sent. For example, the first network provider can send the accounting start message to the second network provider. For instance, NMD 1020 or access server 7010 can send the accounting start message to access server 7011. In one or more embodiments, the accounting start message can be used in accounting for resource and/or network usage of MSD 1040. For example, the accounting start message can be used in a call detail record of MSD 1040.

Figure 9:
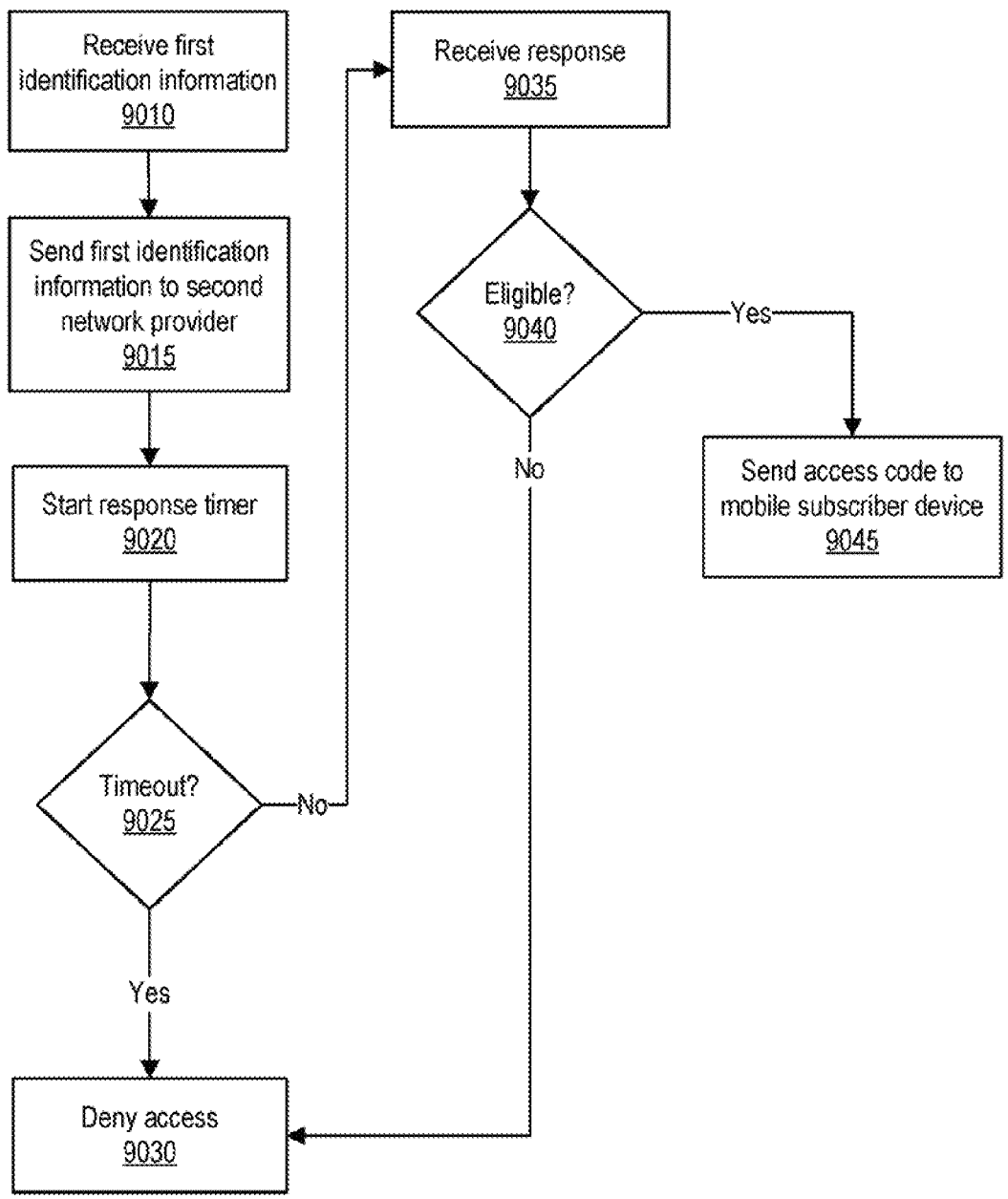
FIG. 9 illustrates a method for sending an access code, according to one or more embodiments.

Turning now to FIG. 9, a method for sending an access code is illustrated, according to one or more embodiments. At 9010, first identification information can be received. For example, the first identification information can be received through AP 1030 operated by the first network provider, where the first access point is coupled to MSD 1040 associated with the second network provider. In one instance, the mobile subscriber device can be coupled to the first access point in a wired fashion. In another instance, the mobile subscriber device can be coupled to the first access point in a wireless fashion. In one or more embodiments, a computing device operated by the first network provider can receive the first identification information. In one example, NMD 1020 can receive the first identification information from MSD 1040. In another example, web interface 7020 of access server 7010 can receive the first identification information from MSD 1040. In one or more embodiments, NMD 1020 can include one or more structures and/or one or more functionalities associated with access server 7010.

In one or more embodiments, the first identification information can be information of SIM 3060 of MSD 1040. For example, the first identification information can be received from an application executing on MSD 1040, where the application can access information of SIM 3060 and send information of SIM 3060 to the first network provider. In one or more embodiments, the first identification information can include information inputted by a user of MSD 1040. For example, the user can input a telephone number of MSD 1040 into an application executing on MSD 1040 and the application can send the telephone number to the first network provider. For instance, the user can input the telephone number of MSD 1040 into a web browser executing on MSD 1040.

At 9015, the first identification information can be sent to the second network provider. For example, the first identification information can be sent to access interface 7031 of access server 7011 which can be operated by the second network provider. In one instance, NMD 1020 can send the first identification information to access interface 7031 of access server 7011 operated by the second network provider. In another instance, access interface 7030 of access server 7010 can send the first identification information to access interface 7032 of access server 7012, and access interface 7032 can proxy the first identification information to access interface 7031. In one or more embodiments, web interface 7020 can use access interface 7030 to send the first identification information to access interface 7031 of access server 7011.

At 9020, a response timer can be started. For example, NMD 1020 can record and/or store a first time value. At 9025, it can be determined whether or not a timeout occurs. For example, NMD 1020 can periodically check the first time value with a current time value, and if a difference between the first time value and the current time value exceeds a timeout amount of time, access to network 1014 can be denied at 9030. If no timeout occurs, a response can be received at 9035. In one or more embodiments, the response can indicate whether or not MSD 1040 is eligible (e.g., authorized) for access to network 1014. For example, an account can be associated with MSD 1040 and the second network provider can provide the response based on whether or not the account associated with MSD 1040 is in good standing (e.g., no over usage, no outstanding debt, etc.).

At 9040, it can be determined whether or not the response indicates that MSD 1040 is eligible for access to network 1014. If the response indicates that MSD 1040 is not eligible for access to network 1014, the method can proceed to 9030 where access to network 1014 can be denied. If the response indicates that MSD 1040 is eligible for access to network 1014, an access code can be sent to MSD 1040 at 9045.

Figure 10:
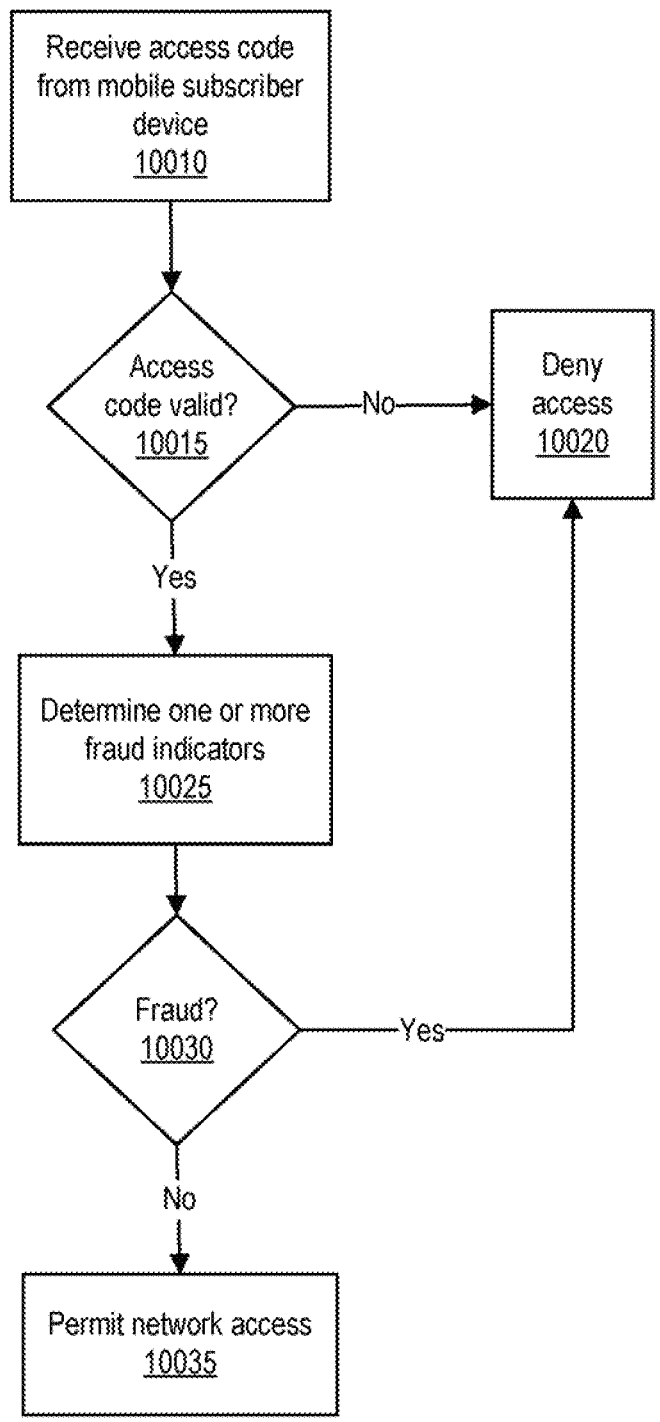
FIG. 10 illustrates a method for accessing a network, according to one or more embodiments.

Turning now to FIG. 10, a method for accessing a network is illustrated, according to one or more embodiments. At 10010, the first network provider can receive the access code from MSD 1040. In one or more embodiments, the first network provider can receive the access code from MSD 1040 through a web interface. For example, the text message can include a URL that includes the access code, the user can select the URL, MSD 1040 can access the URL, and the first network provider can process one or more portions of the URL at a computer system of the network address associated with the URL. In one example, the computer system of the network address associated with the URL can include access server 7010. In another example, the computer system of the network address associated with the URL can include NMD 1020.

At 10015, it can be determined whether or not the access code is valid. In one or more embodiments, an authentication service of access server 7010 can be used to determine whether or not the access code is valid. For example, NMD 1020 or access server 7010 can determine whether or not the access code is valid. In one or more embodiments, NMD 1020 can determine whether or not the access code is valid, if NMD 1020 receives the access code. In one or more embodiments, a determination of whether or not the access code is valid can be based on a location of MSD 1040. In one example, the access code may be valid at location 1050 and not valid at other one or more locations (e.g., one or more of locations 1051 and 1052). For instance, if MSD 1040 used the access code at one or more of locations 1051 and 1052, it can be determined that the access code is not valid. If the access code is not valid, then the method can proceed to 10020, where access to the second network can be denied. In one or more embodiments, denying access to the second network can include maintaining one or more portions of ACL 5020 that are associated with MSD 1040. For example, MSD 1040 may still access the walled garden described above and not be permitted to access further resources of network 1014.

If the access code is valid, the method can proceed to 10025, where one or more fraud indicators can be determined. In one or more embodiments, one or more fraud indicators can include one or more of a number of different MAC addresses associated with an account (e.g., an account associated with MSD 1040) is exceeded, simultaneous usage of the user account for access to network 1014, use of an access code after an amount of time transpiring subsequent to issue of the access code (e.g., twenty-four hours subsequent to issue of the access code), and orientation information of a device (e.g., MSD 1040 may provide orientation information), among others. In one or more embodiments, absence of orientation information of the device can indicate fraud. At 10030, it can be determined whether or not fraud is indicated.

If fraud is indicated, the method can proceed to 10020. If fraud is not indicated, the method can proceed to 10035, where MSD 1040 is permitted to access the second network. In one or more embodiments, permitting MSD 1040 to access the second network can include increasing a number of network addresses and/or services of the second network that MSD 1040 is permitted to access. For example, one or more portions of ACL 5020 can be modified to increase the number of network addresses and/or services of the second network that MSD 1040 is permitted to access. In one or more embodiments, NMD 1020 can modify ACL 5020 to increase the number of network addresses and/or services of the second network that MSD 1040 is permitted to access. In one or more embodiments, NMD 1020 can receive one or more signals and/or a message from a remote computer system (e.g., access server 7010) to increase the number of network addresses and/or services of the second network that MSD 1040 is permitted to access.

It is noted that, in one or more embodiments, the first network provider can be the second network provider. It is also noted that, in one or more embodiments, one or more of the method elements described herein and/or one or more portions of an implementation of a method element may be performed in varying orders, can be performed concurrently with one or more of the other method elements and/or one or more portions of an implementation of a method element, or can be omitted. Additional method elements can be performed as desired. In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
receiving, at a first server coupled to a first network and operated by a first network provider, first identification information of a mobile subscriber device;
sending the first identification information to equipment of a second network provider;
in response to receiving a message indicating that the mobile subscriber device is permitted network access to a second network, generating, at the first server, an access code that permits network access to the second network via the first network;
sending a uniform resource locator that includes the access code to the mobile subscriber device, wherein the access code is different from the first identification information;
receiving the access code from the mobile subscriber device;
determining, at the first server via a first determination, whether the access code is valid after receiving the access code from the mobile subscriber device;
determining, at the first server via a second determination, a fraud indicator associated with the mobile subscriber device;
conditionally permitting the mobile subscriber device access to the second network in response to the first determination indicating that the access code is valid and based on the fraud indicator; and after permitting the mobile subscriber device access to the second network, sending an accounting start message to the second network, wherein the accounting start message causes the second network to start an accounting service, and wherein the accounting service measures resources used by the mobile subscriber device while accessing the second network via the first network.

2. The method of claim 1, wherein the mobile subscriber device is permitted access to the second network conditioned upon the fraud indicator indicating that there is no fraud associated with the mobile subscriber device.

3. The method of claim 1, wherein sending the uniform resource locator to the mobile subscriber device includes using a short message service to send the uniform resource locator to the subscriber device.

4. The method of claim 1, wherein the first server and the mobile subscriber device communicate using wireless Ethernet.

5. The method of claim 1, wherein sending the uniform resource locator to the mobile subscriber device includes addressing a text message to the mobile subscriber device using the first identification information, wherein the text message includes the uniform resource locator.

6. The method of claim 1, wherein conditionally permitting the mobile subscriber device access to the second network includes modifying an access control list to increase a number of network addresses associated with the second network that can be accessed by the mobile subscriber device via the first network.

7. The method of claim 1, wherein the mobile subscriber device is operable to use communications services provided by the second network provider.

8. The method of claim 1, wherein the first identification information includes at least a portion of a mobile identification number, at least a portion of a mobile subscriber integrated services digital network number, at least a portion of an international mobile subscriber identity number, or a combination thereof.

9. The method of claim 1, wherein the fraud indicator indicates that a number of media access control addresses associated with an account associated with the mobile subscriber device exceeds a threshold, that there is simultaneous usage of the account to access the second network by the mobile subscriber device and a second subscriber device, a lack of orientation information from the mobile subscriber device, or a combination thereof.

10. The method of claim 1, further comprising:
receiving, at the first server, a request to access the second network from the mobile subscriber device; and
determining, at the first server, whether the mobile subscriber device is permitted to access the second network based on an access control list.

11. The method of claim 10, further comprising:
transmitting a request for the first identification information in response to a third determination that the mobile subscriber device is not permitted to access the second network based on the access control list.

12. The method of claim 1, wherein determining whether the access code is valid is based on a location of the mobile subscriber device.

13. A system, comprising:
a processor;
a memory coupled to the processor; and
a network interface coupled to the processor, wherein the network interface is coupled to a first network, and wherein the memory includes processor executable instructions that, when executed by the processor, cause the processor to perform operations including:
receiving, via the network interface, first identification information of a mobile subscriber device from a first access point coupled to the first network and operated by a first network provider;
in response to receiving a message indicating that the mobile subscriber device is permitted access by a second network provider to a second network coupled to the first network, generating an access code that permits network access to the second network via the first network;
transmitting a uniform resource locator that includes the access code to the mobile subscriber device, wherein the access code is different from the first identification information;
receiving via the network interface the access code from the mobile subscriber device;
determining, via a first determination, whether the access code is valid after receiving the access code from the mobile subscriber device;
determining, via a second determination, a fraud indicator associated with the mobile subscriber device;
conditionally permitting the mobile subscriber device access to the second network in response to the first determination indicating that the access code is valid and based on the fraud indicator; and
after permitting the mobile subscriber device access to the second network, sending an accounting start message to the second network, wherein the accounting start message causes the second network to start an accounting service, and wherein the accounting service measures resources used by the mobile subscriber device while accessing the second network via the first network.

14. The system of claim 13, wherein the uniform resource locator is received by the mobile subscriber device in a text message.

15. The system of claim 13, wherein the uniform resource locator is received by the mobile subscriber device from a short message service.

16. The system of claim 13, wherein the first access point and the mobile subscriber device communicate using wireless Ethernet.

17. The system of claim 13, wherein the mobile subscriber device is operable to use telecommunications services provided by the second network provider.

18. The system of claim 13, wherein the first identification information includes at least a portion of a mobile identification number, at least a portion of a mobile subscriber integrated services digital network number, at least a portion of an international mobile subscriber identity number, or a combination thereof.

19. A computer readable storage device comprising processor executable instructions that, when executed by a processor, cause the processor to perform operations comprising:
receiving, via a network interface of a first server coupled to a first network and operated by a first network provider, first identification information of a mobile subscriber device;
in response to receiving a message indicating that the mobile subscriber device is permitted access by a second network provider to a second network coupled to the first network, generating an access code that permits network access to the second network via the first network;

transmitting a uniform resource locator that includes the access code to the mobile subscriber device, wherein the access code is different from the first identification information;

receiving the access code from the mobile subscriber device;

determining, via a first determination, whether the access code is valid after receiving the access code from the mobile subscriber device;

determining, via a second determination, a fraud indicator associated with the mobile subscriber device;

conditionally providing the mobile subscriber device access to the second network in response to the first determination indicating that the access code is valid and based on the fraud indicator; and after permitting the mobile subscriber device access to the second network, sending an accounting start message to the second network, wherein the accounting start message causes the second network to start an accounting service, and wherein the accounting service measures resources used by the mobile subscriber device while accessing the second network via the first network.

20. The computer readable storage device of claim 19, wherein the uniform resource locator is received by the mobile subscriber device in a text message.

\* \* \* \* \*